(12) United States Patent
Arataki et al.

(10) Patent No.: US 7,383,377 B2
(45) Date of Patent: Jun. 3, 2008

(54) METHOD AND APPARATUS FOR TRANSFERRING DATA

(75) Inventors: Nina Arataki, Kawasaki (JP); Sadayuki Ohyama, Kawasaki (JP); Yukiaki Kokubo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/353,223

(22) Filed: Feb. 14, 2006

(65) Prior Publication Data

US 2006/0149866 A1 Jul. 6, 2006

Related U.S. Application Data

(63) Continuation-in-part of application No. 11/093,257, filed on Mar. 30, 2005, now abandoned.

(30) Foreign Application Priority Data

Dec. 10, 2004 (JP) .............................. 2004-358142
Nov. 18, 2005 (JP) .............................. 2005-334714

(51) Int. Cl.
*G06F 12/00* (2006.01)
*G06F 13/00* (2006.01)

(52) U.S. Cl. ........................................ 711/110; 710/52

(58) Field of Classification Search ................ 711/110; 710/52
See application file for complete search history.

(56) References Cited

U.S. PATENT DOCUMENTS 4,507,760 A * 3/1985 Fraser ......................... 365/221
5,566,317 A * 10/1996 Treiber et al. ............... 711/117
5,886,981 A * 3/1999 Kamiya ....................... 370/230
6,637,007 B1 * 10/2003 Bots ............................ 714/805
6,647,484 B1 * 11/2003 Jiang et al. .................. 711/220
2003/0131217 A1 * 7/2003 Henry et al. ................ 712/221
2004/0167995 A1 * 8/2004 Fujita et al. .................... 710/5

FOREIGN PATENT DOCUMENTS

| EP | 1 338 965 | 8/2003 |
| EP | 1338965 A2 * | 8/2003 |
| JP | 3-174645 | 7/1991 |
| JP | 2002-259324 | 9/2002 |
| JP | 2002259324 A * | 9/2002 |

* cited by examiner

*Primary Examiner*—Matt Kim
*Assistant Examiner*—Michael C Krofcheck
(74) *Attorney, Agent, or Firm*—Staas & Halsey LLP

(57) ABSTRACT

A pointer comparing unit determines whether a value of a writing pointer is identical to a value of a reading pointer. When it is determined that the value of the writing pointer is different from the value of the reading pointer, an inter-memory transfer unit reads data stored in a location where a data transfer apparatus reads transmission data from a transmission ring buffer, transfers the data to a reception memory, and writes the data in a location designated by the reading pointer of a reception ring buffer. When the inter-memory transfer unit completes writing of the data in the reception ring buffer, a reading-pointer updating unit updates the reading pointer.

21 Claims, 15 Drawing Sheets

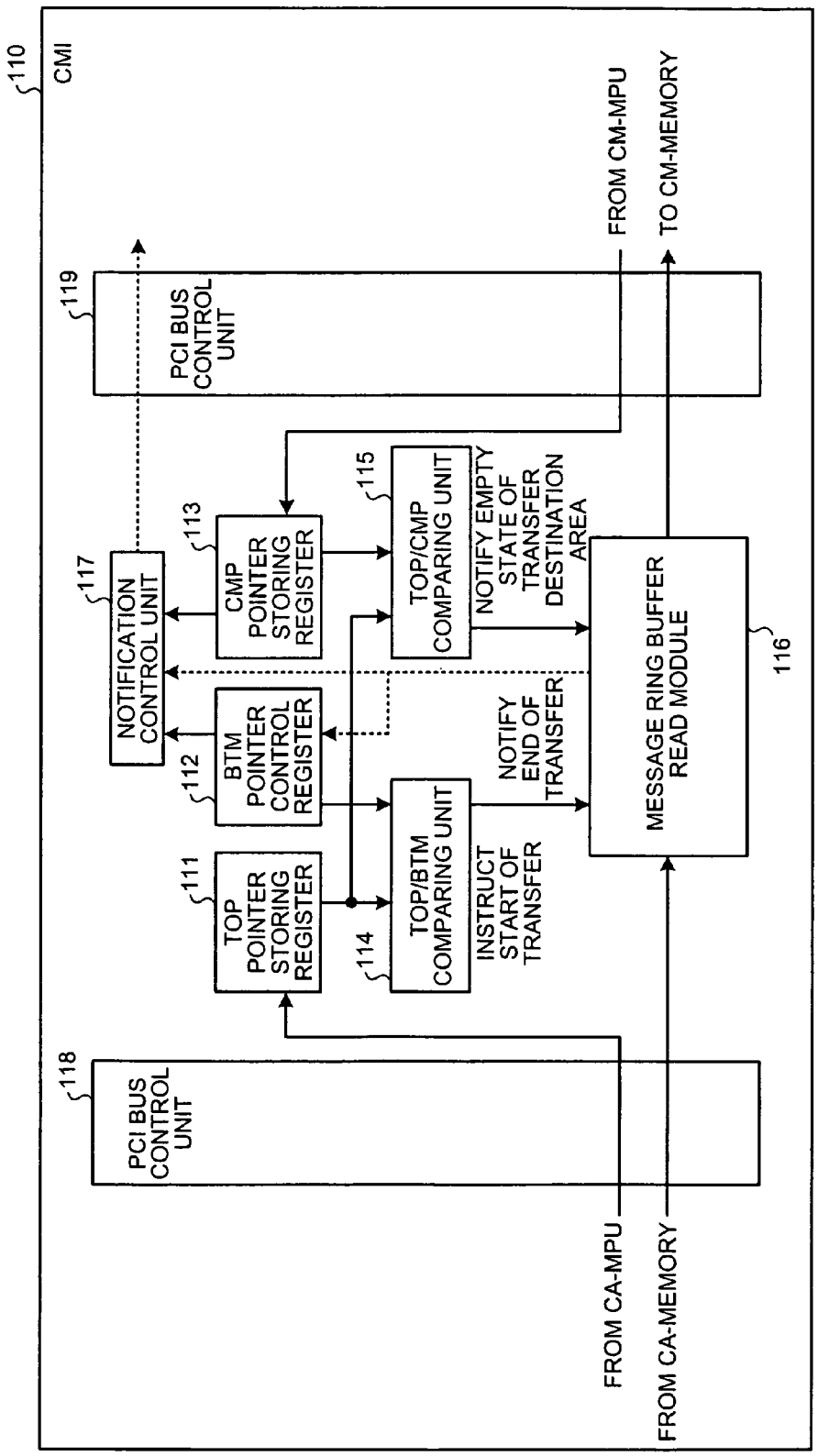

METHOD AND APPARATUS FOR TRANSFERRING DATA

This application is related to and is a continuation-in-part, claiming priority to U.S. application Ser. No. 11/093,257, by Fujitsu Limited of Kawasaki, Japan, filed on Mar. 30, 2005 now abandoned, it being further noted that priority is based upon Japanese Application numbers 2005-334714 and 2004-358142 filed on Nov. 18, 2005 and Dec. 10, 2004 respectively.

BACKGROUND OF THE INVENTION

1. Field of the Invention

The present invention relates to a technology for transferring data from a memory of a transmitting side to a memory of a receiving side, with an improvement of a speed of data transfer and a decrease in a load to operation processing units of the transmitting side and the receiving side by eliminating an exchange of transmitting and receiving addresses.

2. Description of the Related Art

In a disk array apparatus, it is necessary to transfer control information and the like between a channel adapter (CA) that operates as an interface with a host, and a cache manager (CM) that manages a cache.

FIG. 8 is a schematic for illustrating a structure of a conventional disk array apparatus. A disk array apparatus 7 is connected to a host 2 via a fiber channel link 3, having a CA 70, a plurality of CMs 80, and a disk 90. The CA 70 and the CMs 80 are connected via a peripheral component interconnect (PCI) bus, and several bridges and switches intervene between the CA 70 and the CMs 80.

The CA 70 has a CA-MPU 71 serving as an operation processing unit, a corresponding CA memory 72, and a large-scale integrated-circuit (LSI) 700 that includes a direct-memory-access (DMA) engine for transferring data between the CA 70 and the CMs 80. The CM 80 includes a cache manager-micro processing unit (CM-MPU) 81 serving as an operation processing unit and a corresponding CM memory 82. Data transfer of 8 bytes to 512 bytes of control information is performed between the CA 70 and the CMs 80 before the DMA transfer and the like.

FIG. 9 is a schematic for explaining a conventional sequence of data transfer from the CM 80 to the CA 70 (a read sequence). In the data transfer from the CM 80 to the CM 70, the CM-MPU 81 stores a message (MSG), which is data to be transferred to the CM memory 82, and a memory address (ADR) in which the message is stored. The LSI 700 occasionally reads that the CM 80 is in a transferable state and confirms the state (*).

If the CM 80 is in the transferable state, the CM-MPU 81 stores (writes) the address (ADR), in which the transfer message (MSG) is stored, in the CA memory 72 ((1)). Then, the CM MPU 81 writes an address (WP) of the CA memory 72, in which the ADR is stored, in the LSI 700. The LSI 700 notifies the CA-MPU 71 of the presence of the WP ((2) broken line).

According to the notification from the LSI 700, the CA-MPU 71 reads an interrupt factor to detect the presence of the WP in the LSI 700 and reads the WP on the LSI 700 to read the ADR, in which the message is stored, from the CA memory 72 designated by the WP ((3)).

The CA-MPU 71 notifies the LSI 700 of the ADR information to start the LSI 700 ((4)). The started LSI 700 transfers the message on the CM memory 82 designated by the ADR to the CA memory 72 ((5)).

FIG. 10 is a schematic for explaining a conventional sequence of data transfer from the CA 70 to the CM 80 (a write sequence). As shown in the figure, in data transfer from the CA 70 to the CM 80, the CA-MPU 71 uses a DMA function of the LSI 700 to write a message (MSG) in the CM memory 82 ((1)).

The CA-MPU 71 writes an address, in which the message is stored, on a register of the LSI 700 ((2)). The LSI 700 notifies the CM-MPU 81 of the presence of the address by generating an interrupt ((3)). Then, the CM-MPU 81 having received the interrupt reads an interrupt factor and the address ((4)). Then, the CM-MPU 81 notifies the LSI 700 of the address of the processed message ((5)).

Regarding a message transfer between processors, for example, Japanese Patent Application Laid-Open No. H3-174645 discloses a technique for transferring a message between CPUs using a shared random access memory (RAM).

In the read sequence shown in FIG. 9, the CM-MPU 81 determines an address of the CM memory 82 in which the transmission message is stored. Thus, the CM-MPU 81 is required to notify the CA-MPU 71 of this address before the DMA is started. In addition, in the write sequence shown in FIG. 10, since the CA-MPU 71 determines a transmission destination address, it is unnecessary to perform communication between MPUs before the DMA is started. However, the CA-MPU 71 is required to notify the CM-MPU 81 of the transmission destination address after the DMA is started.

It is necessary to communicate address information between the MPUs in both the sequences. In the communication between the MPUs, the CA 70 and the CMs 80 are connected by a PCI bus or a switch. Thus, a communication takes long time and a large load is imposed on the MPUs.

Another problem in a message transfer between the CPUs described in Japanese Patent Application Laid-Open No. H3-174645 is that a shared RAM is required.

SUMMARY OF THE INVENTION

It is an object of the present invention to solve at least the above problems in the conventional technology.

A data transfer apparatus according to one aspect of the present invention, which transfers data from a transmission memory with which a transmission operation-processing-unit serving as an operation processing unit on a data transmission side performs reading and writing data to a reception memory with which a reception operation-processing-unit serving as an operation processing unit on a data reception side performs reading and writing data, includes a writing-pointer storing unit that stores a writing pointer that designates a first location where the transmission operation-processing-unit writes transmission data in a transmission ring buffer that stores data to be transferred, using a relative value to a location of the transmission ring buffer, where the writing pointer is updated upon the transmission operation-processing-unit writing the transmission data in the transmission ring buffer; a reading-pointer storing unit that stores a reading pointer that designates a second location where the data transfer apparatus reads the transmission data from the transmission ring buffer, using a relative value to the location of the transmission ring buffer; a pointer comparing unit that compares a first value with a second value to determine whether the first value is identical to the second value, where the first value is a value of the writing pointer stored in the writing-pointer storing unit, and the second value is a value of the reading pointer stored in the reading-pointer storing unit; an inter-memory transfer unit that, when the pointer comparing unit determines that the first value is different from the second value, reads data stored in the second location, transfers the data read to the reception memory, and writes the data in a third location designated by the reading pointer of a reception ring buffer that stores reception data; and a reading-pointer updating unit that, when the inter-memory transfer unit completes writing of the data in the reception ring buffer, updates the reading pointer stored in the reading-pointer storing unit.

A data transfer apparatus according to another aspect of the present invention, which transfers data from a transmission memory with which a transmission operation-processing-unit serving as an operation processing unit on a data transmission side performs reading and writing data to a reception memory with which a reception operation-processing-unit serving as an operation processing unit on a data reception side performs reading and writing data, includes a writing-pointer storing unit that stores a writing pointer that designates a first location where the transmission operation-processing-unit writes a storage address of transmission data in a transmission ring buffer that stores a storage address of data to be transferred, using a relative value to a location of the transmission ring buffer, where the writing pointer is updated upon the transmission operation-processing-unit writing the storage address of the transmission data in the transmission ring buffer; a reading-pointer storing unit that stores a reading pointer that designates a second location where the data transfer apparatus reads the storage address of the transmission data from the transmission ring buffer, using a relative value to the location of the transmission ring buffer; a pointer comparing unit that compares a first value with a second value to determine whether the first value is identical to the second value, where the first value is a value of the writing pointer stored in the writing-pointer storing unit, and the second value is a value of the reading pointer stored in the reading-pointer storing unit; an inter-memory transfer unit that, when the pointer comparing unit determines that the first value is different from the second value, reads data of which the storage address is stored in the second location, transfers the data read to the reception memory, and writes the data in a third location designated by the reading pointer of a reception ring buffer that stores reception data; and a reading-pointer updating unit that, when the inter-memory transfer unit completes writing of the data in the reception ring buffer, updates the reading pointer stored in the reading-pointer storing unit.

A data transfer apparatus according to still another aspect of the present invention, which transfers data from a transmission memory with which a transmission operation-processing-unit serving as an operation processing unit on a data transmission side performs reading and writing data to a reception memory with which a reception operation-processing-unit serving as an operation processing unit on a data reception side performs reading and writing data, includes a writing-pointer storing unit that stores a writing pointer that designates a first location where the transmission operation-processing-unit writes transmission data in a transmission ring buffer that stores data to be transferred, using a relative value to a location of the transmission ring buffer, where the writing pointer is updated upon the transmission operation-processing-unit writing the transmission data in the transmission ring buffer; a reading-pointer storing unit that stores a reading pointer that designates a second location where the data transfer apparatus reads the transmission data from the transmission ring buffer, using a relative value to the location of the transmission ring buffer;

a pointer comparing unit that compares a first value with a second value to determine whether the first value is identical to the second value, where the first value is a value of the writing pointer stored in the writing-pointer storing unit, and the second value is a value of the reading pointer stored in the reading-pointer storing unit; an inter-memory transfer unit that, when the pointer comparing unit determines that the first value is different from the second value, reads data stored in the second location, transfers the data read to the reception memory, and writes a transfer destination address in a third location designated by the reading pointer of a reception ring buffer that stores a storage address of reception data; and a reading-pointer updating unit that, when the inter-memory transfer unit completes writing of the transfer destination address in the reception ring buffer, updates the reading pointer stored in the reading-pointer storing unit.

A data transfer apparatus according to still another aspect of the present invention, which transfers data from a transmission memory with which a transmission operation-processing-unit serving as an operation processing unit on a data transmission side performs reading and writing data to a reception memory with which a reception operation-processing-unit serving as an operation processing unit on a data reception side performs reading and writing data, includes a writing-pointer storing unit that stores a writing pointer that designates a first location where the transmission operation-processing-unit writes a storage address of transmission data in a transmission ring buffer that stores a storage address of data to be transferred, using a relative value to a location of the transmission ring buffer, where the writing pointer is updated upon the transmission operation-processing-unit writing the storage address of the transmission data in the transmission ring buffer; a reading-pointer storing unit that stores a reading pointer that designates a second location where the data transfer apparatus reads the storage address of the transmission data from the transmission ring buffer, using a relative value to the location of the transmission ring buffer; a pointer comparing unit that compares a first value with a second value to determine whether the first value is identical to the second value, where the first value is a value of the writing pointer stored in the writing-pointer storing unit, and the second value is a value of the reading pointer stored in the reading-pointer storing unit; an inter-memory transfer unit that, when the pointer comparing unit determines that the first value is different from the second value, reads data of which the storage address is stored in the second location, transfers the data read to the reception memory, and writes a transfer destination address in a third location designated by the reading pointer of a reception ring buffer that stores a storage address of reception data; and a reading-pointer updating unit that, when the inter-memory transfer unit completes writing of the transfer destination address in the reception ring buffer, updates the reading pointer stored in the reading-pointer storing unit.

A data transfer method according to still another aspect of the present invention, which is for a data transfer apparatus that transfers data from a transmission memory with which a transmission operation-processing-unit serving as an operation processing unit on a data transmission side performs reading and writing data to a reception memory with which a reception operation-processing-unit serving as an operation processing unit on a data reception side performs reading and writing data, includes comparing a first value with a second value to determine whether the first value is identical to the second value, where the first value is a value of a writing pointer that designates a first location where the transmission operation-processing-unit writes transmission data in a transmission ring buffer that stores data to be transferred, using a relative value to a location of the transmission ring buffer, the writing pointer is updated upon the transmission operation-processing-unit writing the transmission data in the transmission ring buffer, and the second value is a value of a reading pointer that designates a second location where the data transfer apparatus reads the transmission data from the transmission ring buffer, using a relative value to the location of the transmission ring buffer; an inter-memory transfer including reading, when it is determined that the first value is different from the second value at the determining, data stored in the second location, transferring the data read to the reception memory, and writing the data in a third location designated by the reading pointer of a reception ring buffer that stores reception data; and updating, when writing of the data in the reception ring buffer is completed at the inter-memory transfer, updates the reading pointer.

A data transfer method according to still another aspect of the present invention, which is for a data transfer apparatus that transfers data from a transmission memory with which a transmission operation-processing-unit serving as an operation processing unit on a data transmission side performs reading and writing data to a reception memory with which a reception operation-processing-unit serving as an operation processing unit on a data reception side performs reading and writing data, includes comparing a first value with a second value to determine whether the first value is identical to the second value, where the first value is a value of a writing pointer that designates a first location where the transmission operation-processing-unit writes a storage address of transmission data in a transmission ring buffer that stores a storage address of data to be transferred, using a relative value to a location of the transmission ring buffer, the writing pointer is updated upon the transmission operation-processing-unit writing the storage address of the transmission data in the transmission ring buffer, and the second value is a value of a reading pointer that designates a second location where the data transfer apparatus reads the storage address of the transmission data from the transmission ring buffer, using a relative value to the location of the transmission ring buffer; an inter-memory transfer including reading, when it is determined that the first value is different from the second value at the determining, data of which the storage address is stored in the second location, transferring the data read to the reception memory, and writing the data in a third location designated by the reading pointer of a reception ring buffer that stores reception data; and updating, when writing of the data in the reception ring buffer is completed at the inter-memory transfer, the reading pointer.

A data transfer method according to still another aspect of the present invention, which is for a data transfer apparatus that transfers data from a transmission memory with which a transmission operation-processing-unit serving as an operation processing unit on a data transmission side performs reading and writing data to a reception memory with which a reception operation-processing-unit serving as an operation processing unit on a data reception side performs reading and writing data, includes comparing a first value with a second value to determine whether the first value is identical to the second value, where the first value is a value of a writing pointer that designates a first location where the transmission operation-processing-unit writes transmission data in a transmission ring buffer that stores data to be transferred, using a relative value to a location of the transmission ring buffer, the writing pointer is updated upon the transmission operation-processing-unit writing the transmission data in the transmission ring buffer, and the second value is a value of a reading pointer that designates a second location where the data transfer apparatus reads the transmission data from the transmission ring buffer, using a relative value to the location of the transmission ring buffer; an inter-memory transfer including reading, when it is determined that the first value is different from the second value at the determining, data stored in the second location, transferring the data read to the reception memory, and writing a transfer destination address in a third location designated by the reading pointer of a reception ring buffer that stores a storage address of reception data; and updating, when writing of the transfer destination address in the reception ring buffer is completed at the inter-memory transfer, the reading pointer.

A data transfer method according to still another aspect of the present invention, which is for a data transfer apparatus that transfers data from a transmission memory with which a transmission operation-processing-unit serving as an operation processing unit on a data transmission side performs reading and writing data to a reception memory with which a reception operation-processing-unit serving as an operation processing unit on a data reception side performs reading and writing data, includes comparing a first value with a second value to determine whether the first value is identical to the second value, where the first value is a value of a writing pointer that designates a first location where the transmission operation-processing-unit writes a storage address of transmission data in a transmission ring buffer that stores a storage address of data to be transferred, using a relative value to a location of the transmission ring buffer, the writing pointer is updated upon the transmission operation-processing-unit writing the storage address of the transmission data in the transmission ring buffer, and the second value is a value of a reading pointer that designates a second location where the data transfer apparatus reads the storage address of the transmission data from the transmission ring buffer, using a relative value to the location of the transmission ring buffer; an inter-memory transfer including reading, when it is determined that the first value is different from the second value at the determining, data of which the storage address is stored in the second location, transferring the data read to the reception memory, and writing a transfer destination address in a third location designated by the reading pointer of a reception ring buffer that stores a storage address of reception data; and updating, when writing of the transfer destination address in the reception ring buffer is completed at the inter-memory transfer, the reading pointer.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 2 is a block diagram of a structure of a communication interface (CMI) according to the first embodiment;

DETAILED DESCRIPTION OF THE PREFERRED EMBODIMENTS

Exemplary embodiments of the present invention are explained in detail below with reference to the accompanying drawings.

Figure 1A:
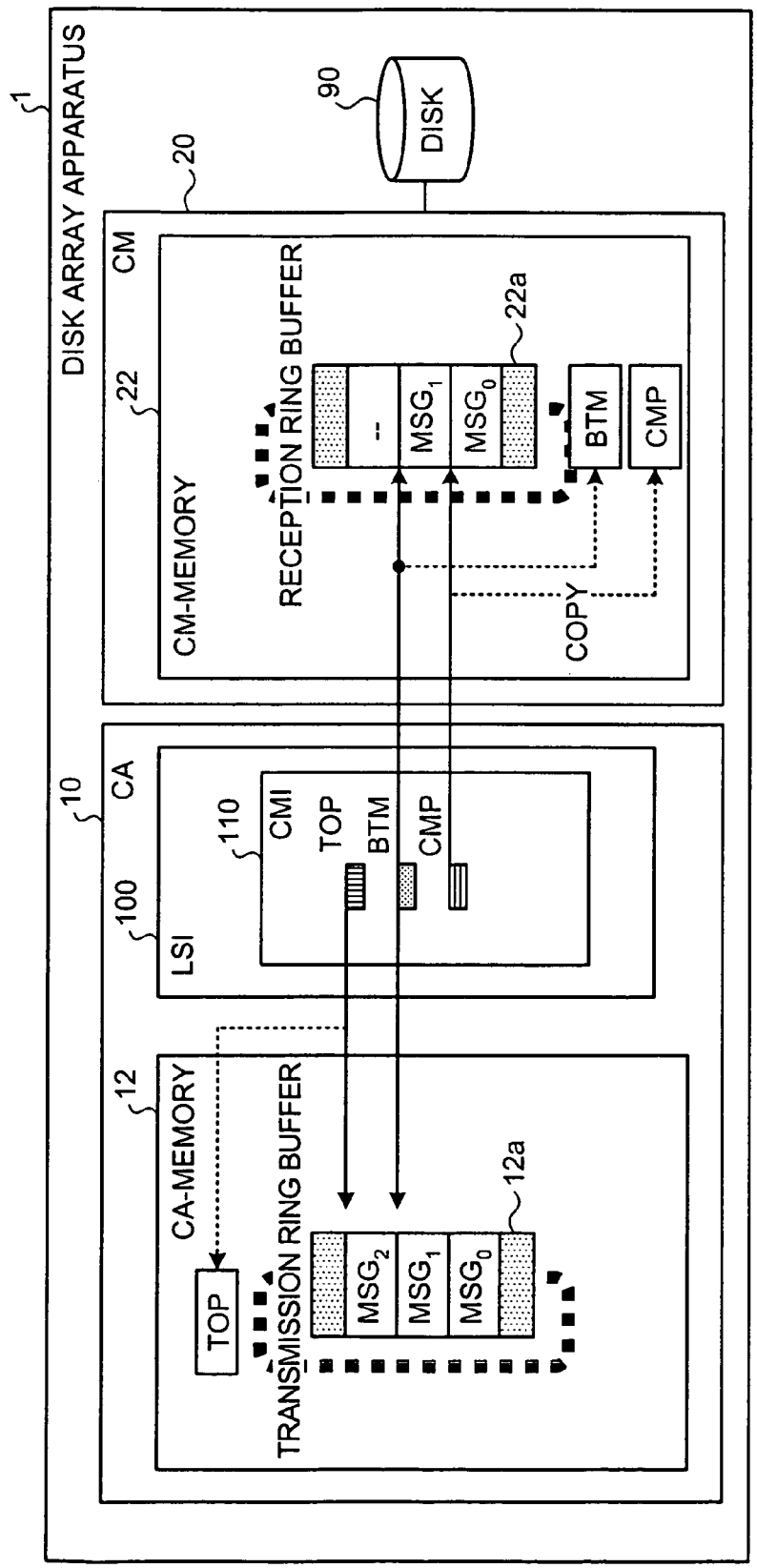
FIG. 1A is a schematic for explaining a system for data transfer from a channel adapter (CA) to a cache manager (CM) by a disk array apparatus according to a first embodiment of the invention.

FIG. 1A is a schematic for explaining the system for data transfer from the CA to the CM by the disk array apparatus according to an embodiment of the present invention. In the disk array apparatus 1, a ring buffer for transmission 12a, in which a transmission message is stored, is prepared in a CA memory 12 and a ring buffer for reception 22a, in which a reception message is stored, is prepared in a CM memory 22.

The ring buffer for transmission 12a and the ring buffer for reception 22a are ring buffers having the same structure. Pointers of the ring buffer for transmission 12a and the ring buffer for reception 22a are synchronized. A message stored in a location of the ring buffer for transmission 12a designated by a pointer A is transferred to a location of the ring buffer for reception 22a designated by a pointer A.

Therefore, a transmission destination address can be calculated as an address obtained by adding an address for the pointer to an address of the ring buffer for reception 22a. Thus, it is unnecessary to communicate the transmission destination address between MPUs every time a message is transferred.

Consequently, three pointers, namely, a TOP pointer, a BTM pointer, and a CMP pointer are prepared in a communication interface (CMI) 110 serving as a functional unit that performs message transfer according to a DMA between the CA memory 12 and the CM memory 22 in an LSI 100.

The TOP pointer designates a location where a transfer message is written in the ring buffer for transmission 12a. The BTM pointer designates a location of a message to be read from the ring buffer for transmission 12a and a location where a message is stored in the ring buffer for reception 22a.

The CMP pointer designates a location where an MPU of a CM 20 reads a reception message from the ring buffer for reception 22a. In other words, the CMP pointer designates the next location of a message, for which processing by the MPU of the CM 20 is completed, in the ring buffer for reception 22a.

Note that a pointer indicates a number of a storage location of a message. Since the number of the storage location is set as the pointer instead of an address of the storage location, it is possible to reduce an amount of information of the pointer and increase speed of reading and writing the pointer.

An MPU of a CA 10 stores a transmission message in the ring buffer for transmission 12a to update the TOP pointer and writes the updated TOP pointer in the CMI 110. Then, since the TOP pointer and the BTM pointer are different, the CMI 110 determines that there is the transmission message.

The CMI 110 reads the transmission message from the location of the ring buffer for transmission 12a designated by the BTM pointer, transfers the transmission message to the CM memory 22, and writes the transmission message in the location of the ring buffer for reception 22a designated by the BTM pointer. In addition, the CMI 110 writes the BTM pointer in the CM memory 22 to update the BTM pointer.

An MPU of the CM 20 reads a received message using the CMP pointer in the CM memory 22. When processing for the read message ends, the MPU of the CM 20 updates the CMP pointer and applies writing to the CMP pointer in the CMI 110 to thereby notify the CMI 110 of the end of the message processing.

For example, as shown in FIG. 1A, three messages $MSG_0$, $MSG_1$, and $MSG_2$ are prepared in the ring buffer for transmission 12a by the MPU of the CA 10 and the TOP pointer designates the message $MSG_2$. Since the message $MSG_1$ is being transferred, the BTM pointer designates the message $MSG_1$. In addition, since the message $MSG_0$ has been transferred and has not been subjected to processing by the MPU of the CM 20, the CMP pointer designates the message $MSG_0$.

As an initial value, the TOP pointer, the BTM pointer, and the CMP pointer are set to "0". The MPU of the CA 10 stores the transferred two messages $MSG_0$ and the $MSG_1$ in the ring buffer for transmission 12a to update the TOP pointer to "2". At this point, the TOP pointer is 2, the BTM pointer is 0, and the CMP pointer is 0.

Then, the CMI 110 detects the fact that the TOP pointer is not equal to the BTM pointer and starts transfer of the message $MSG_0$. When the CMI 110 ends the transfer of the $MSG_0$, the CMI 110 sends an interrupt to the MPU of the CM 20 to increment the BTM pointer. At this point, the TOP pointer is 2, the BTM pointer is 1, and the CMP pointer is 0.

On the other hand, the MPU of the CM 20 recognizes that a message has arrived according to the interrupt from the CMI 110. The MPU of the CM 20 reads the message $MSG_0$ from the location of the ring buffer for reception 22a designated by the CMP pointer and processes the message $MSG_0$. When the processing of the $MSG_0$ is completed, the MPU of the CM 20 increments the CMP pointer, writes the CMP pointer in the CMI 110, and notifies the CMI 110 that the reception of the message $MSG_0$ ends normally. At this point, the TOP pointer is 2, the BTM pointer is 1, and the CMP pointer is 1.

In addition, the CMI 110 repeats the transfer of the message and the update of the BTM pointer until the TOP pointer is made equal to the BTM pointer. Note that the CMI 110 performs the transfer of the message and the update of the BTM pointer without waiting for the update of the CMP pointer by the MPU of the CM 20.

As described above, in the disk array apparatus according to the first embodiment, the ring buffers having the same structure are provided in the CA memory 12 and the CM memory 22, the TOP pointer, the BTM pointer, and the CMP pointer are provided in the CM 110, and the CMI 110 transfers the message from the CA memory 12 to the CM memory 22 using these ring buffers and pointers. Thus, it is unnecessary to communicate address information between the MPU of the CA 10 and the MPU of the CM 20. Therefore, it is possible to transfer the message at high speed and reduce loads on both the MPUs.

In particular, general-purpose devices like a switch and a router are placed between the CM 20 and the CA 10. Thus, if information of the CMI 110 is read from the MPU of the CM 20, it takes long until completion of the reading, and the loads on the MPU of the CM 20 increases. In order to avoid this problem, in the message transmission from the MPU of the CA 10 to the MPU of the CM 20, the CMI 110 writes the BTM pointer in the CM memory 22 to thereby notify the MPU of the CM 20 of a writing location in the ring buffer for reception 22a. Consequently, the MPU of the CM 20 can acquire a storage location of the reception message without reading a register of the CMI 110.

Note that, in this explanation, a message is transferred from the CA 10 to the CM 20. However, by providing a ring buffer for transmission in the CM memory 22 and providing a ring buffer for reception in the CA memory 12, it is possible to transfer a message from the CM 20 to the CA 10 according to the same system.

In addition, in this explanation, a message is stored in the ring buffer for transmission and the ring buffer for reception. However, it is also possible to store an address of a storage destination of a message in the ring buffers.

Figure 1B:
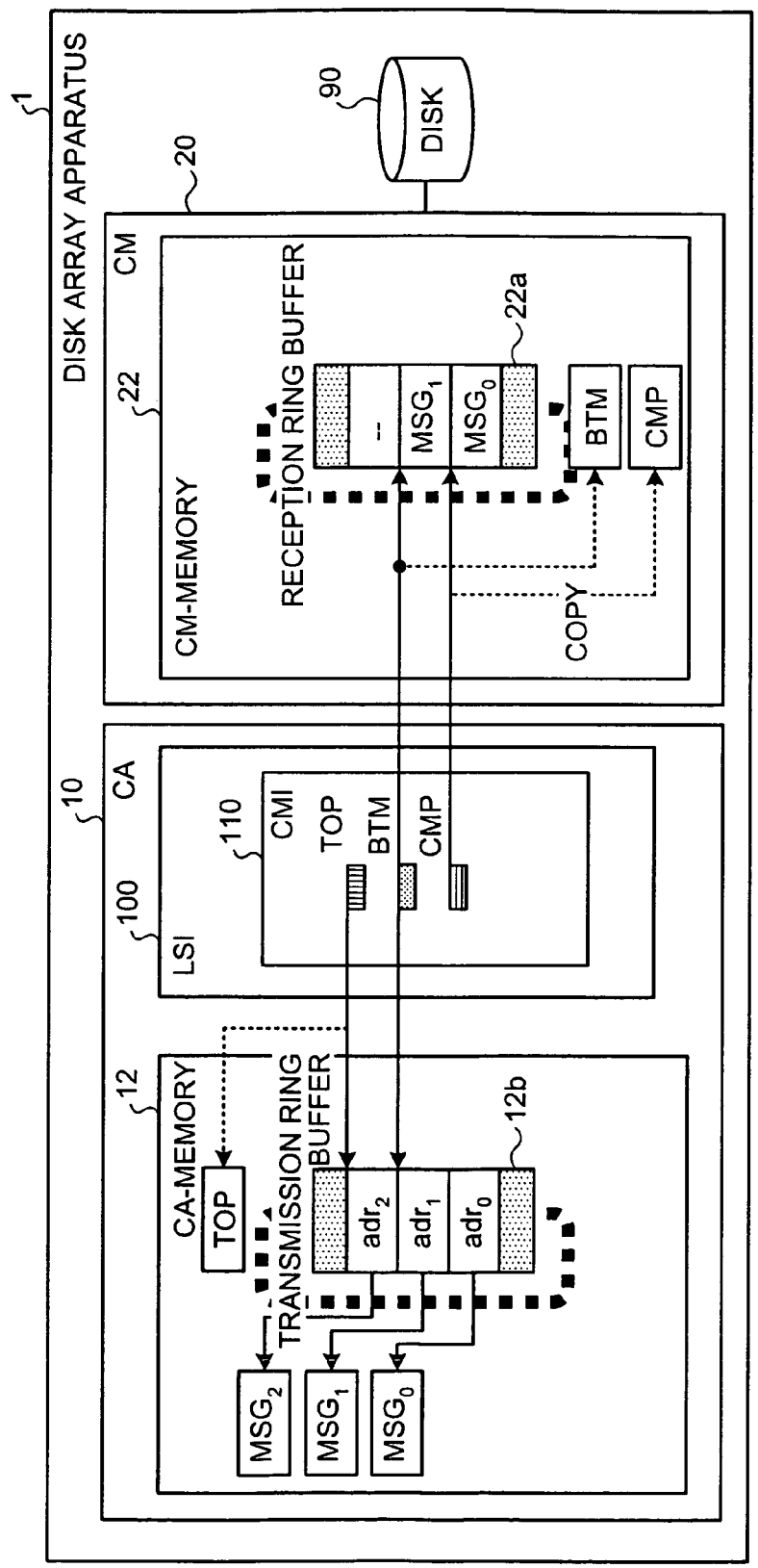
FIG. 1B is a schematic for explaining storage of a message storing address in a ring buffer for transmission instead of a message.

FIG. 1B is a schematic for explaining storage of a message storing address in the ring buffer for transmission instead of a message. As shown in the figure, addresses $adr_0$, $adr_1$, $adr_2$, and the like of storage destinations of the messages $MSG_0$, $MSG_1$, and $MSG_2$ are stored in a ring buffer for transmission 12b.

FIG. 2 is a block diagram of the structure of the CMI 110 according to the present embodiment. Note that, in this explanation, a message is transferred from the CA 10 to the CM 20.

As shown in the figure, the CMI 110 has a TOP pointer storing register 111, a BTM pointer control register 112, a CMP pointer storing register 113, a TOP/BTM comparing unit 114, a TOP/CMP comparing unit 115, a message ring buffer read module 116, a notification control unit 117, and PCI bus control units 118 and 119.

The TOP pointer storing register 111 is a register that stores a TOP pointer. When the MPU of the CA 10 writes a message in the ring buffer for transmission 12a, the MPU of the CA 10 updates the TOP pointer in this TOP pointer storing register 111.

The BTM pointer control register 111 is a register that stores a BTM pointer. When the CMI 110 is notified of the end of message transfer from the CA memory 12 to the CM memory 22 by the message ring buffer read module 116, the CMI 110 increments the BTM pointer.

The CMP pointer storing register 113 is a register that stores a CMP pointer. When the MPU of the CM 20 completes processing for a reception message, the MPU of the CM 20 updates the CMP pointer in this CMP pointer storing register 113.

The TOP/BTM comparing unit 114 compares the TOP pointer stored in the TOP pointer storing register 111 and the BTM pointer stored in the BTM pointer control register 112. When the TOP pointer is not equal to the BTM pointer, the TOP/BTM comparing unit 114 instructs the message ring buffer read module 116 to start message transfer.

The TOP/CMP comparing unit 115 compares the TOP pointer and the CMP pointer to determine whether there is a free space in the ring buffer for reception 22a of the CM memory 22. When the ring buffer for reception 22a is not in an empty state and values of the TOP pointer and the CMP pointer are the same, the TOP/CMP comparing unit 115 determines that there is no free space in the ring buffer for reception 22a.

The message ring buffer read module 116 receives an instruction to start message transfer from the TOP/BTM comparing unit 114. When the TOP/CMP comparing unit 115 determines that there is a free space in the ring buffer for reception 22a, the message ring buffer read module 116 reads a message from a location of the ring buffer for transmission 12a of the CA memory 12 designated by the BTM pointer and transmits the message to a location of the ring buffer for reception 22a of the CM memory 22 designated by the BTM pointer. In addition, when the message transfer ends, this message ring buffer read module 116 notifies the BTM pointer control register 112 and the notification control unit 117 of the end of the transfer.

When the notification control unit 117 is notified of the end of the message transfer by the message ring buffer read module 116, the notification control unit 117 generates an interrupt to the MPU of the CM 20 to notify the MPU of the CM 20 that there is an unprocessed message in the ring buffer for reception 22a.

The PCI bus control unit 118 controls a PCI bus that connects with the MPU of the CA 10 and the CA memory 12. The PCI bus control unit 119 controls a PCI bus that connects with the MPU of the CM 20 and the CM memory 22.

FIG. 2 depicts the structure of the CMI 110 at the time when a message is stored in the ring buffer for transmission 12a. However, when a message storage address is stored in the ring buffer for transmission 12b, a structure of a CMI is different.

Figure 3:
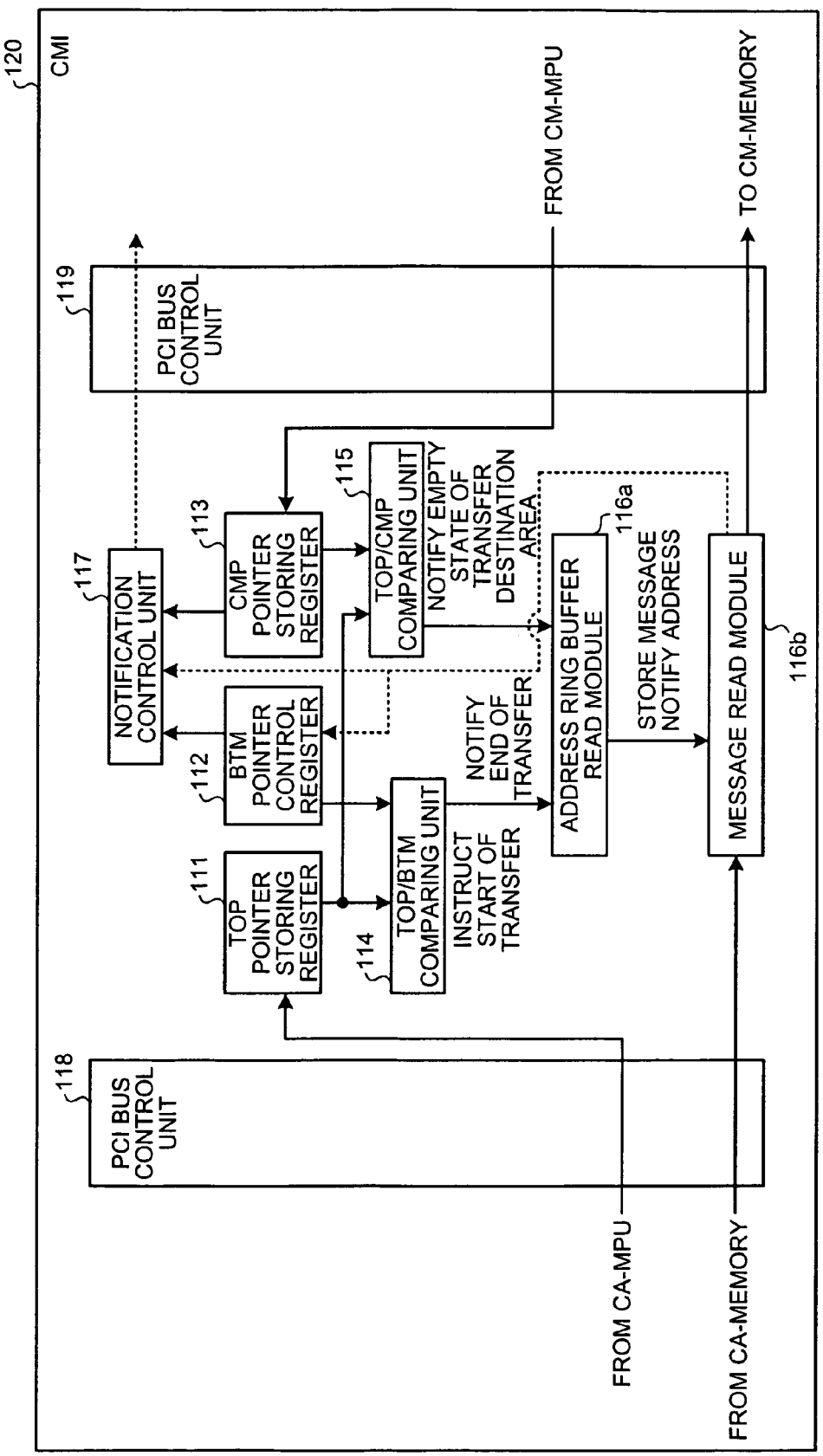
FIG. 3 is a block diagram of a structure of a CMI at the time when a message storing address is stored in the ring buffer for transmission.

FIG. 3 is a block diagram of a structure of a CMI at the time when a message storing address is stored in the ring buffer for transmission 12b. Note that, for convenience of explanation, functional units playing the same roles as those shown in FIG. 2 are denoted by the identical reference numerals and signs, and detailed explanations of the functional units are omitted.

As shown in FIG. 3, compared with the CMI 110 shown in FIG. 2, a CMI 120 has an address ring buffer read module 116a and a message read module 116b instead of the message ring buffer read module 116.

The address ring buffer read module 116a reads a message storage address from the ring buffer for transmission 12b and passes the message storage address to the message read module 116b.

The message read module 116b reads a message from the CA memory 12 designated by the message storage address received from the address ring buffer read module 116*a* and transmits the message to a corresponding location in the ring buffer for reception 22*a* of the CM memory 22.

In this way, since the address ring buffer read module 116*a* and the message read module 116*b* are provided instead of the message ring buffer read module 116, it is possible to transfer the message, a storage address of which is stored in the ring buffer for transmission 12*b*.

Figure 4:
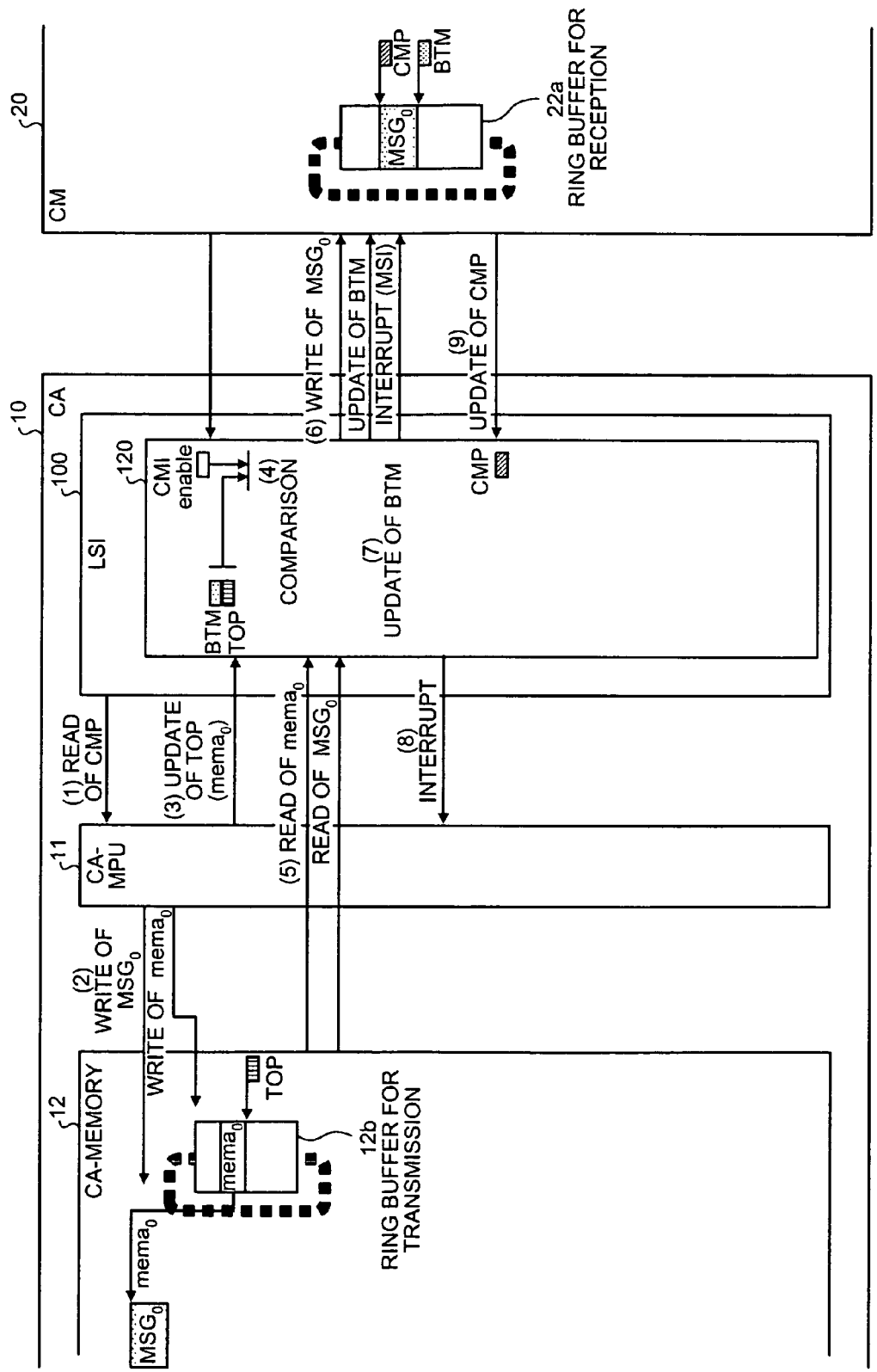
FIG. 4 is a schematic for explaining an operation sequence of transfer of a single message from the CA to the CM.

FIG. 4 is a schematic for explaining an operation sequence at the time when a single message is transferred from the CA 10 to the CM 20. Note that, in this explanation, a message storage address is stored in the ring buffer for transmission 12*b*.

As shown in the figure, in this message transfer, a CA-MPU 11 serving as the MPU of the CA 10 reads a CMP pointer from the CMP pointer storing register 113 of the CMI 120 and compares the CMP pointer with a TOP pointer stored in the CA memory 12 to check whether there is a free space in the ring buffer for reception 22*a* ((1)).

Specifically, when the ring buffer for reception 22*a* is not empty and the CMP pointer and the TOP pointer are equal, the CA-MPU 11 determines that there is no free space in the ring buffer for reception 22*a*. Note that, as described later, when there is no free space in the ring buffer for reception 22*a*, since the CMI 120 does not transfer a message to the ring buffer for reception 22*a*, this part of the processing may be omitted.

When there is a free space in the ring buffer for reception 22*a*, the CA-MPU 11 writes an address $mema_0$, where a transmission message $MSG_0$ is stored, in the ring buffer for transmission 12*b* ((2)) to update the TOP pointer in the CA memory 12 and update the TOP pointer in the CMI 120 ((3)).

Then, the CMI 120 having the updated TOP pointer compares the TOP pointer and the BTM pointer if the CM 20 is in an enable state (a message receivable state) ((4)). Since the TOP pointer and the BTM pointer are different, the CMI 120 reads the address $mema_0$ and the message $MSG_0$ ((5)).

The CMI 120 stores the read message $MSG_0$ in a location of the ring buffer for reception 22*a* designated by the BTM pointer to update the BTM pointer in the CM memory 22 and generates an interrupt to the MPU of the CM 20 ((6)). The CMI 120 updates the BTM pointer stored in the BTM pointer control register 112 ((7)) and generates an interrupt to the CA-MPU 11 ((8)).

On the other hand, the MPU of the CM 20 having received the interrupt processes the reception message in the ring buffer for reception 22*a*. Then, the MPU of the CM 20 updates the CMP pointer stored in the CMP pointer storing register 113 ((9)) and notifies the CMI 120 that the processing for the reception message is completed.

In this way, when the TOP pointer and the BTM pointer are different, the CMI 120 reads a message storage address from a location of the ring buffer for transmission 12*b* designated by the BTM pointer and transfers a message stored in an area designated by the message storage address of the CA memory 12 to a location of the ring buffer for reception 22*a* designated by the BTM pointer. Consequently, it is possible to transfer the message without communicating address information between the MPU of the CA 10 and the MPU of the CM 20.

Figure 5:
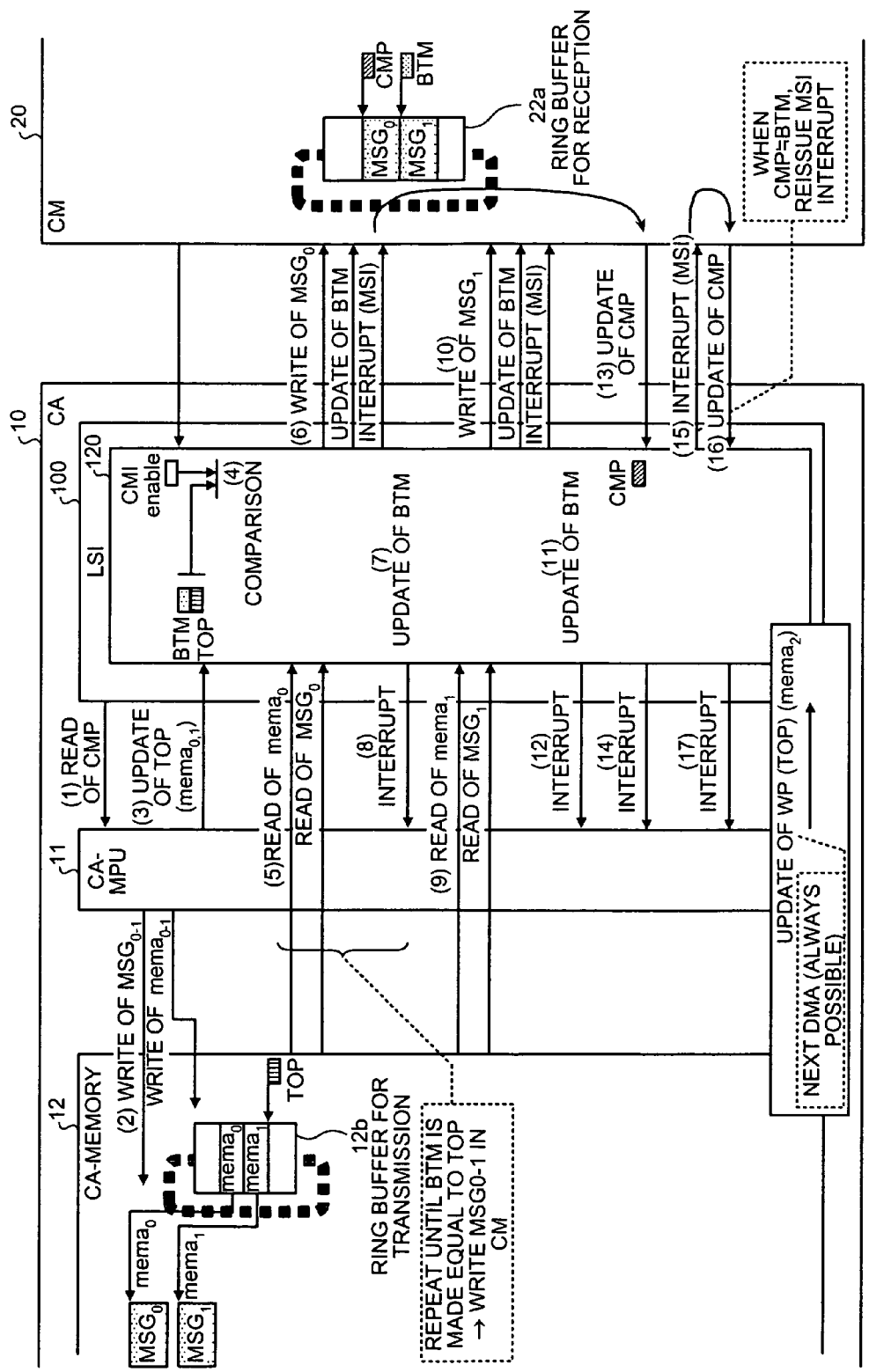
FIG. 5 is a schematic for explaining an operation sequence of transfer of two messages from the CA to the CM.

FIG. 5 is a schematic for explaining an operation sequence at the time when two messages are transferred from the CA 10 to the CM 20. As shown in the figure, (1) to (8) of the sequence are the same as those in the sequence shown in FIG. 4 except that two message storage addresses $mema_0$ and $mema_1$ are stored in the ring buffer for transmission 12*b* and a difference between the TOP pointer and the BTM pointer is "2".

After generating the interrupt to the CA-MPU 11 in (8) of the sequence, the CMI 120 reads a second message $MSG_1$ ((9)). The CMI 120 transfers the read $MSG_1$ to a location of the ring buffer for reception 22*a* designated by the BTM pointer to update the BTM pointer in the CM memory 22 and generates an interrupt to the MPU of the CM 20. ((10)). Then, the CMI 120 updates the BTM pointer stored in the BTM pointer control register 112 and generates an interrupt to the CA-MPU 11 ((12)).

On the other hand, the MPU of the CM 20 having received the interrupt processes the reception messages $MSG_0$ and the $MSG_1$ in the ring buffer for reception 22*a*. Then, the MPU of the CM 20 updates the CMP pointer stored in the CMP pointer storing register 113 ((13)) and notifies the CMI 120 that processing for the reception messages $MSG_0$ and $MSG_1$ is completed.

The CMI 120, which is notified that the processing for the reception messages $MSG_0$ and $MSG_1$ is completed, generates an interrupt to the CA-MPU 11 ((14)). In addition, the CMI 120 compares the CMP pointer and the BTM pointer. Since the CMP pointer and the BTM pointer are different, the CMI 120 recognizes that the reception processing for the two messages have been performed by the MPU of the CM 20 and generates an interrupt to the MPU of the CM 20 ((15)).

The MPU of the CM 20 updates the CMP pointer stored in the CMP pointer storing register 113 ((16)). The CMI 120 having the updated CMP pointer generates an interrupt to the MPU of the CM 20 ((17)).

In this way, the CMI 120, which is notified that the processing for the reception messages is completed, compares the CMP pointer and the BTM pointer and, when the CMP pointer and the BTM pointer are different, recognizes that reception processing for plural messages has been performed by the MPU of the CM 20, and generates an interrupt to the MPU of the CM 20. The MPU of the CM 20 updates the CMP pointer stored in the CMP pointer storing register 113. Consequently, even when processing for plural reception messages is performed in the MPU of the CM 20 collectively, it is possible to update the CMP pointer correctly.

Note that, in the explanation of this example, the MPU of the CM 20 performs the processing for the two reception messages collectively. However, it is also possible that, before the second message MSG1 is written in the ring buffer for reception 22*a*, the processing for the message $MSG_0$ ends and the MPU of the CM 20 updates the CMP pointer stored in the CMP pointer storing register 113.

Figure 6:
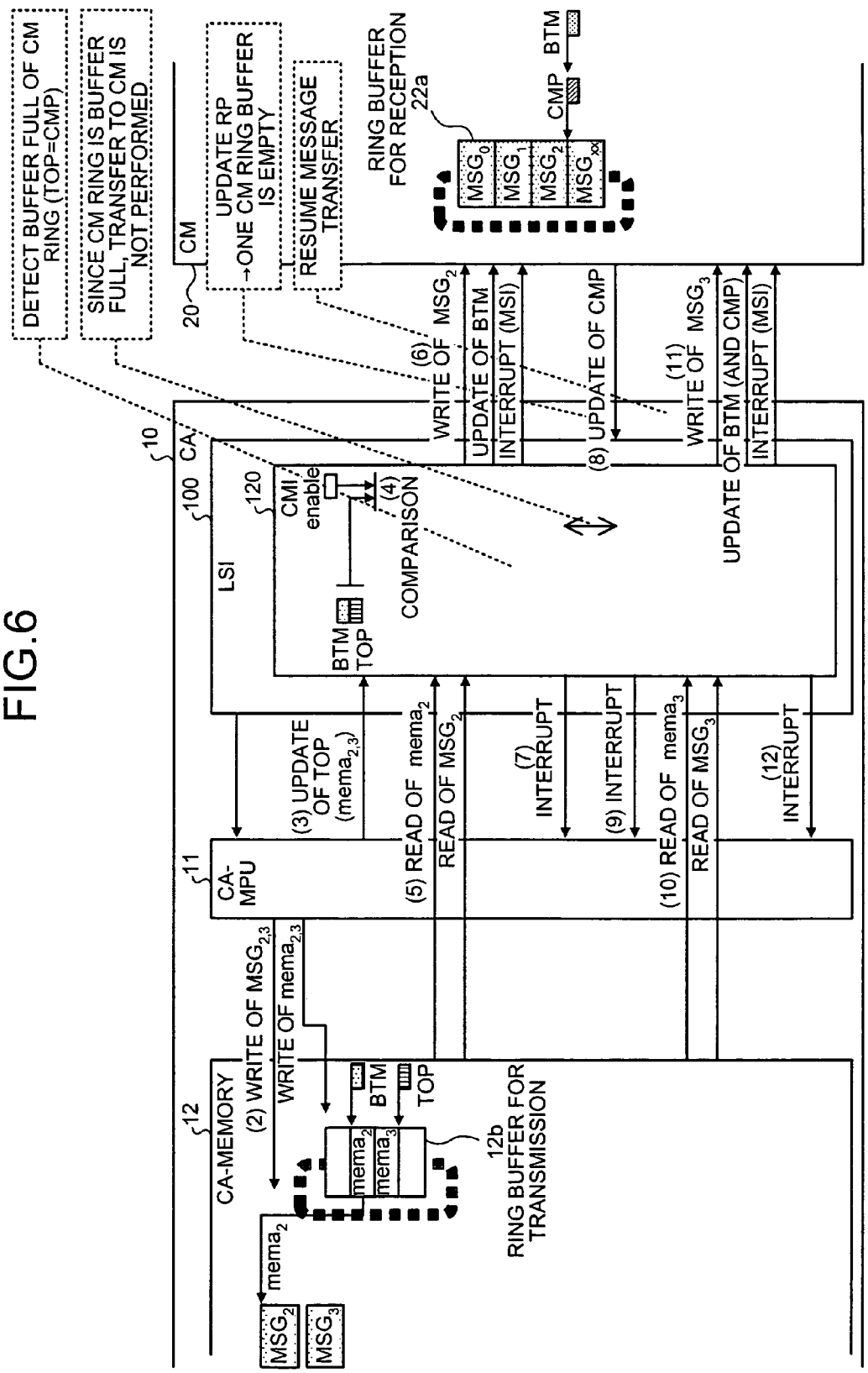
FIG. 6 is a schematic for explaining an operation sequence in a state in which a ring buffer for reception is full when a message is transferred from the CA to the CM.

FIG. 6 is a schematic for explaining an operation sequence in a state in which the ring buffer for reception 22*a* is full when a message is transferred from the CA 10 to the CM 20. In the figure, a message $MSG_2$ of two messages $MSG_2$ and $MSG_3$ is written in the ring buffer for reception 22*a* in the same manner as the operation sequence shown in FIG. 5.

However, here, since there is an unprocessed message in an area where the message $MSG_3$ is written, the ring buffer for reception 22*a* is in a buffer-full state. The judgment on whether there is a free space in the ring buffer for reception 22*a*, which is performed by the CA-MPU 11 in the beginning of the sequence, is omitted.

Since a difference between the CMP pointer and the BTM pointer is "1", the CMI 120, which has written the message $MSG_2$ in the ring buffer for reception 22*a*, recognizes that the ring buffer for reception 22a comes into the buffer-full state, stops the transfer of the message $MSG_3$, and generates an interrupt to the CA-MPU 11 ((7)).

Thereafter, when the MPU of the CM 20 ends the processing for the reception messages and one free space is formed in the ring buffer for reception 22a, the MPU of the CM 20 updates the CMP pointer stored in the CMP pointer storing register 113 ((8)).

Then, the CMI 120 recognizes that the reception processing for the messages has been performed by the MPU of the CM 20 and generates an interrupt to the MPU of the CM 20 ((9)). In addition, the CMI 120 reads the message $MSG_3$ from the CA memory 12 ((10)), writes the message $MSG_3$ in the ring buffer for reception 22a to update the BTM pointer in the CM memory 22, and generates an interrupt to the MPU of the CM 20 ((11)). Then, the CMI 120 generates an interrupt to the MPU of the CM 20 ((12)).

In this way, when the ring buffer for reception 22a is in the buffer-full state, the CMI 120 stops the transfer of the messages until a free space is formed in the ring buffer for reception 22a. Thus, it is possible to prevent the reception messages in the ring buffer for reception 22a from being overwritten before the messages are processed.

Figure 7:
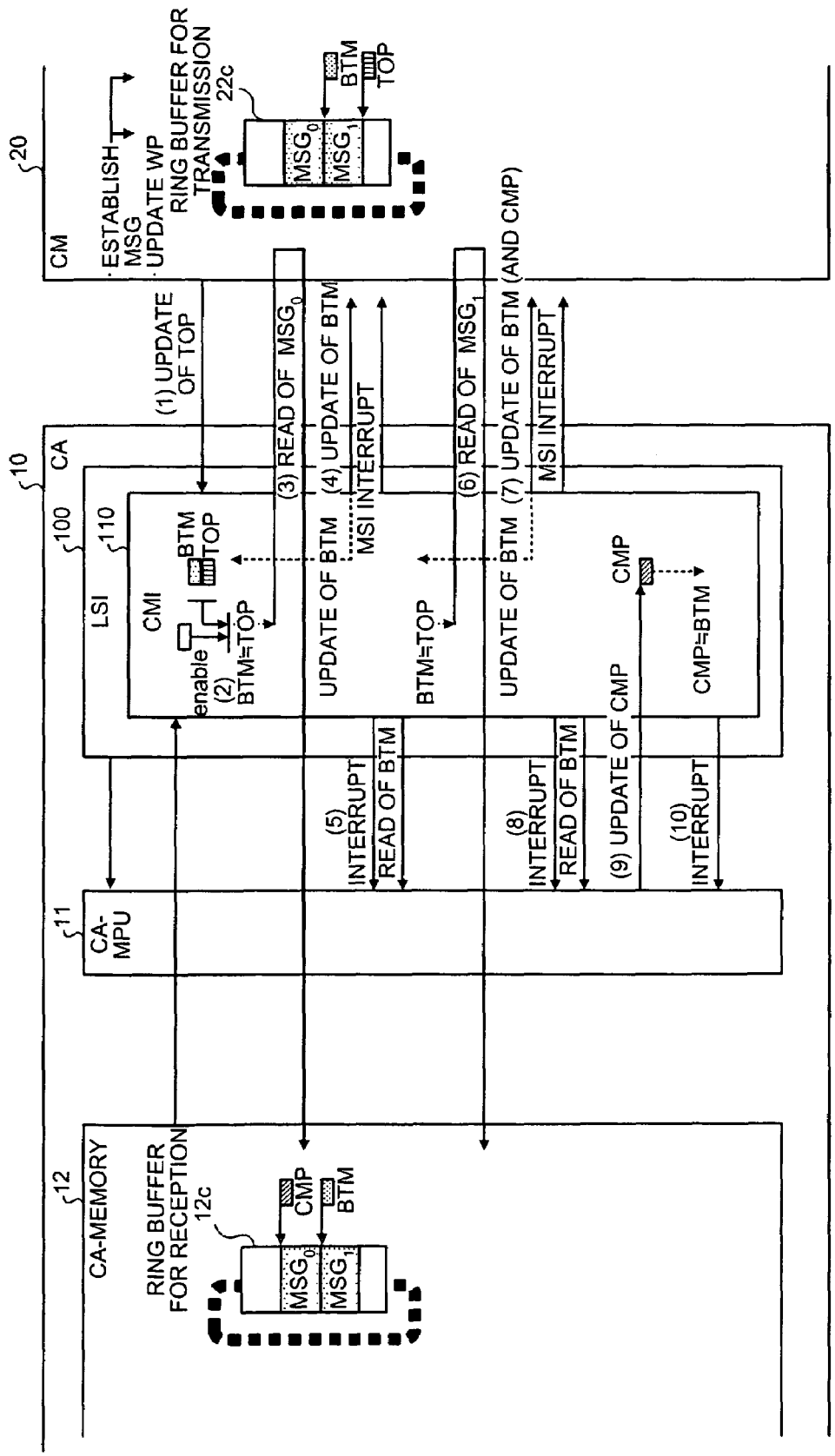
FIG. 7 is a schematic for explaining an operation sequence of message transfer from the CM to the CA.
Figure 8:
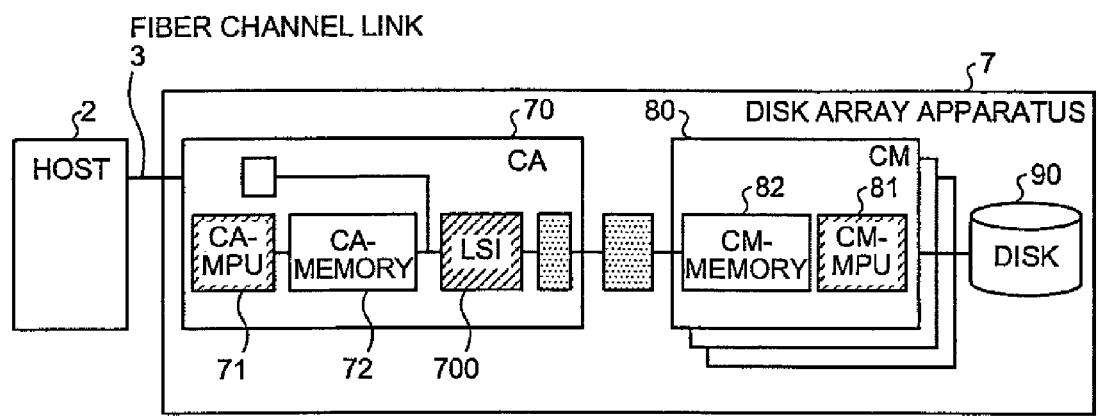
FIG. 8 is a diagram of a structure of a conventional disk array apparatus.
Figure 9:
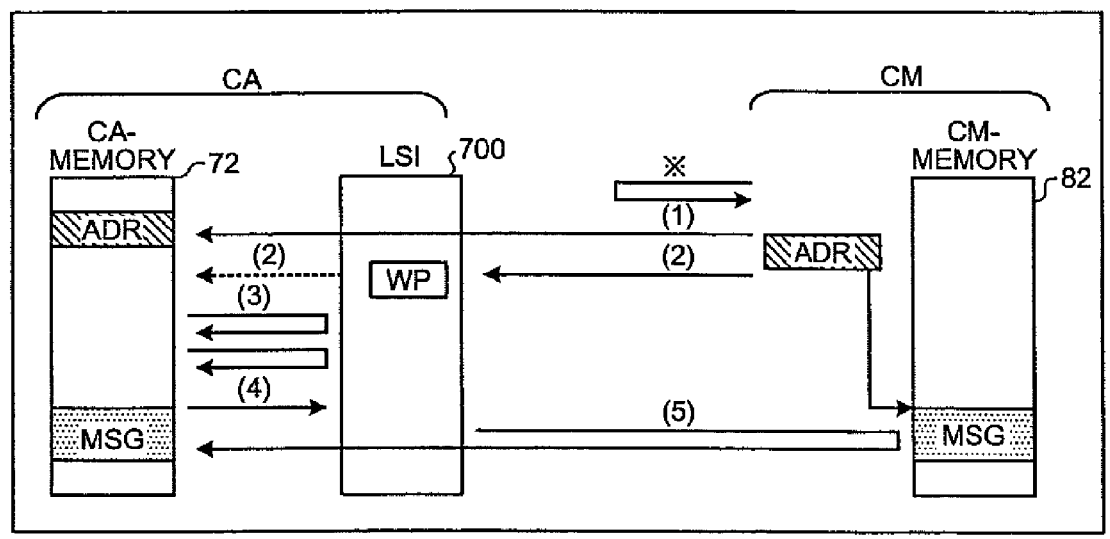
FIG. 9 is a schematic for explaining a conventional sequence of data transfer from a CM to a CA (a read sequence)
Figure 10:
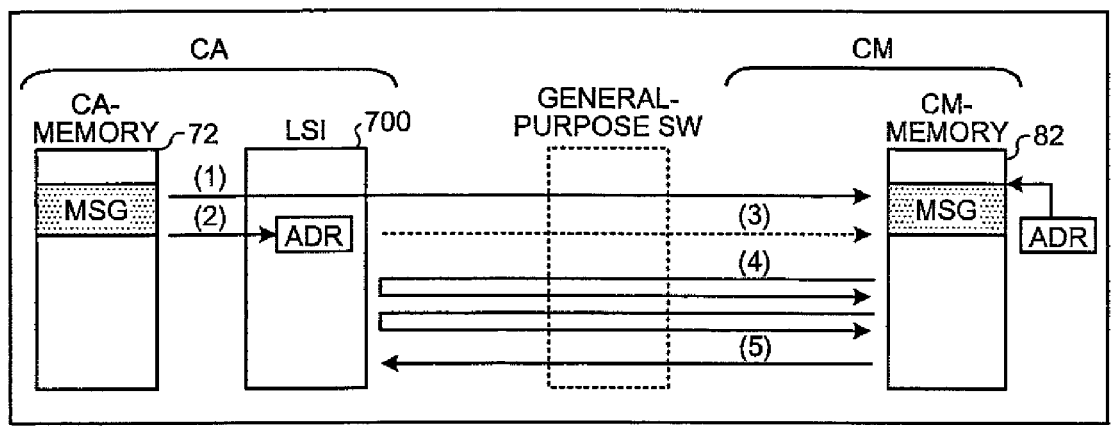
FIG. 10 is a schematic for explaining a conventional sequence of data transfer from the CA to the CM (a write sequence).

FIG. 7 is a schematic for explaining the operation sequence for message transfer from the CM 20 to the CA 10. Note that, in this explanation, transmission messages are stored in a ring buffer for transmission 22c in the CM memory 22 and reception messages are stored in a ring buffer for reception 12c in the CA memory 12.

As shown in the figure, in this message transfer, the MPU of the CM 20 writes the transmission messages $MSG_0$ and $MSG_1$ in the ring buffer for transmission 22c to update the TOP pointer in the CM memory 22 and update the TOP pointer in the CMI 110 ((1)).

Then, if the CA 10 is in an enable state (a message receivable state), the CMI 110 having the updated TOP pointer compares the TOP pointer and the BTM pointer ((2)). Since the TOP pointer and the BTM pointer are different, the CMI 110 reads the message $MSG_0$ from the ring buffer for transmission 22c and writes the message $MSG_0$ in an area of the ring buffer for reception 12c designated by the BTM pointer ((3)).

The CMI 110 updates the BTM pointer stored in the BTM pointer control register 112, updates the BTM pointer in the CM memory 22, and generates an interrupt to the MPU of the CM 20 ((4)). In addition, the CMI 110 generates an interrupt to the CA-MPU 11, and the CA-MPU 11 reads the BTM pointer stored in the BTM pointer control register 112 to update the BTM pointer in the CA memory 12 ((5)).

When the CMI 110 compares the TOP pointer and the BTM pointer, the TOP pointer and the BTM pointer are different. Thus, the CMI 110 reads the message MSG1 from the ring buffer for transmission 22c and writes the message MSG1 in an area of the ring buffer for reception 12c designated by the TM pointer ((6)). Then, the CMI 110 updates the BTM pointer stored in the BTM pointer control register 112, updates the BTM pointer in the CM memory 22, and generates an interrupt to the MPU of the CM 20 ((7)).

In addition, the CMI 110 generates an interrupt to the CA-MPU 11, and the CA-MPU 11 reads the BTM pointer stored in the BTM pointer control register 112 to update the BTM pointer in the CA memory 12 ((8)).

Thereafter, when the CA-MPU 11 ends the processing for the reception messages, the CA-MPU 11 updates the CMP pointer stored in the CMP pointer storing register 113 ((9)). When the CMI 110 compares the CMP pointer and the BTM pointer, the CMP pointer and the BTM pointer are not the same. Thus, the CMI 110 generates an interrupt to the CA-MPU 11 ((10)).

In this way, when the TOP pointer and the BTM pointer are different, the CMI 110 reads a message from a location of the ring buffer for transmission 22c designated by the BTM pointer and transfers the message to an area of the ring buffer for reception 12c designated by the BTM pointer. Consequently, it is possible to transfer the message from the CM 20 to the CA 10 without communicating address information between the MPU of the CA 10 and the MPU of the CM 20.

As described above, according to the present embodiment, the ring buffers having the identical structure are provided in the CA memory 12 and the CM memory 22, the TOP pointer storing register 111, which stores the TOP pointer, and the BTM pointer control register 112, which stores the BTM pointer, are provided in the CMI 120. The TOP/BTM comparing unit 114 compares the TOP pointer and the BTM pointer. When values of the TOP pointer and the BTM pointer are different, the address ring buffer read module 116a reads a message storage address designated by the BTM pointer from the ring buffer for transmission 12b. The message read module 116b reads a message from the CA memory 12 designated by the message storage address and writes the message in a location of the ring buffer for reception 22a designated by the BTM pointer. Thus, it is possible to transfer the message without communicating address information between the MPU of the CA 10 and the MPU of the CM 20, increase speed of message communication, and reduce loads on the MPUs.

Note that, in the PCI bus (in particular, PCI-Express), an interrupt notification may be sent by simple writing rather than through a dedicated line for interrupt (MSI: Message Signaled Interrupt). In this case, when interrupt write transfer is lost because of various reasons, even if transmission of a message itself is completed, the MPU cannot recognize the completion of the transmission.

Thus, it is also possible to provide a timer, which monitors time from transmission of a message until notification of completion of reception of the message (write in a CMP), in a CMI so that such an interrupt loss can be detected. When a predetermined time elapses, the timer notifies the MPU of occurrence of abnormality. Consequently, it is possible to improve reliability of message communication.

In addition, in the explanation of the present embodiment, a message is transferred between the MPU of the CA and the MPU of the CM in the disk array apparatus 1. However, the invention is not limited to this and can be applied in the same manner when a message is transferred between MPUs of other devices.

Further, in the explanation of the present embodiment, the channel adapter and the cache manager are connected to the MPU via the PCI but. However, the invention is not limited to this and can be applied in the same manner when the channel adapter and the cache manager are connected to the MPU by other connection systems.

According to the present invention, transmission and reception of transmission and reception addresses between the transmission operation-processing-unit and the reception operation-processing-unit are made unnecessary. Thus, it is possible to improve a data transfer rate and reduce loads on the transmission operation-processing-unit and the reception operation-processing-unit.

Furthermore, reception data is prevented from being overwritten by another data before the reception data is processed by the reception operation-processing-unit. Thus, it is possible to transfer data surely.

Moreover, since an interrupt loss is detected, it is possible to improve reliability of the data transfer.

Furthermore, a completion pointer is updated correctly even when processing for plural reception data is completed by the reception operation-processing-unit. Thus, it is possible to transfer data correctly.

Moreover, data is transferred only when the reception operation-processing-unit is in a receivable state. Thus, it is possible to improve reliability of the data transfer.

Furthermore, since a bus bridge can be used, it is possible to establish a data transfer system with high scalability.

Moreover, speed of communication between the channel adapter and the cache control device is increased. Thus, it is possible to improve performance of the disk array apparatus.

In the first embodiment, it is necessary to separately perform error check to check whether message transfer is correctly performed between the CA and the CM. For example, when a message is transferred from the CA to the CM, the MPU of the CM needs to separately inquire of the CA about information on an error to check whether a parity error occurs when data is read out from the memory of the CA. Consequently, processing time for checking whether the message transfer is correctly performed is increased.

Thus, in a second embodiment of the present invention, a CMI that reduces processing time for checking whether message transfer is correctly performed is explained. In the explanation in the second embodiment, a message is transferred from the CA to the CM. It is assumed that an address of the message is stored in a transmission ring buffer in the CA-memory.

Figure 11:
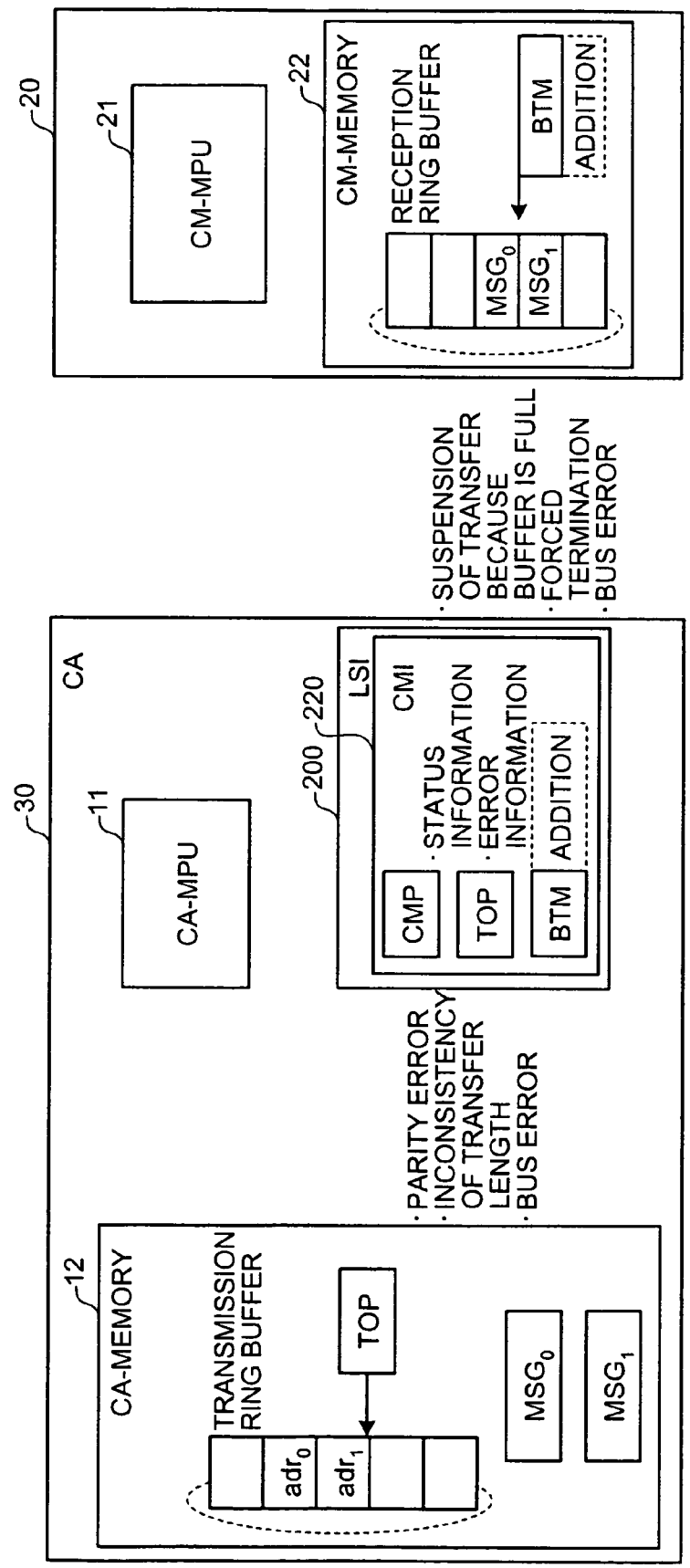
FIG. 11 is a schematic for explaining a method of notifying the CM of status information and error information by a CMI according to a second embodiment of the invention.

FIG. 11 is a schematic for explaining a method of notifying the CM of status information and error information by the CMI according to the second embodiment. The status information is information on a state of message transfer. The error information is information on abnormality that occurs in the message transfer.

As shown in FIG. 11, a CA 30 includes a CA-MPU 11, a CA-memory 12, and an LSI 200. The LSI 200 includes a CMI 220 that performs message transfer according to a DMA. The CMI 220 adds status information and error information to a BTM pointer and retains the information. The CMI 220 writes the information in the CM-memory 22 when the BTM pointer in the CM-memory 22 is updated.

Examples of errors that occur at the time of message transfer include a parity error from readout of a message or an address from the CA-memory 12 until reception of the message or the address by the LSI 200, a bus error (timeout, abort, etc.) inside the CA 30 or between the CA 30 and the CM 20, inconsistency of a designated message length and length of a message actually transferred, suspension of data transfer because of reception ring buffer being full on the CM side, and forced termination of message transfer by the CA-MPU 11.

In this way, the CMI according to the second embodiment adds status information and error information to the BTM pointer and retains the information and writes the information in the CM-memory 22 when the BTM pointer in the CM-memory 22 is updated. Consequently, the CM 20 can check whether content of a message is normal or abnormal using the additional information, thereby reducing processing time for the check.

Figure 12:
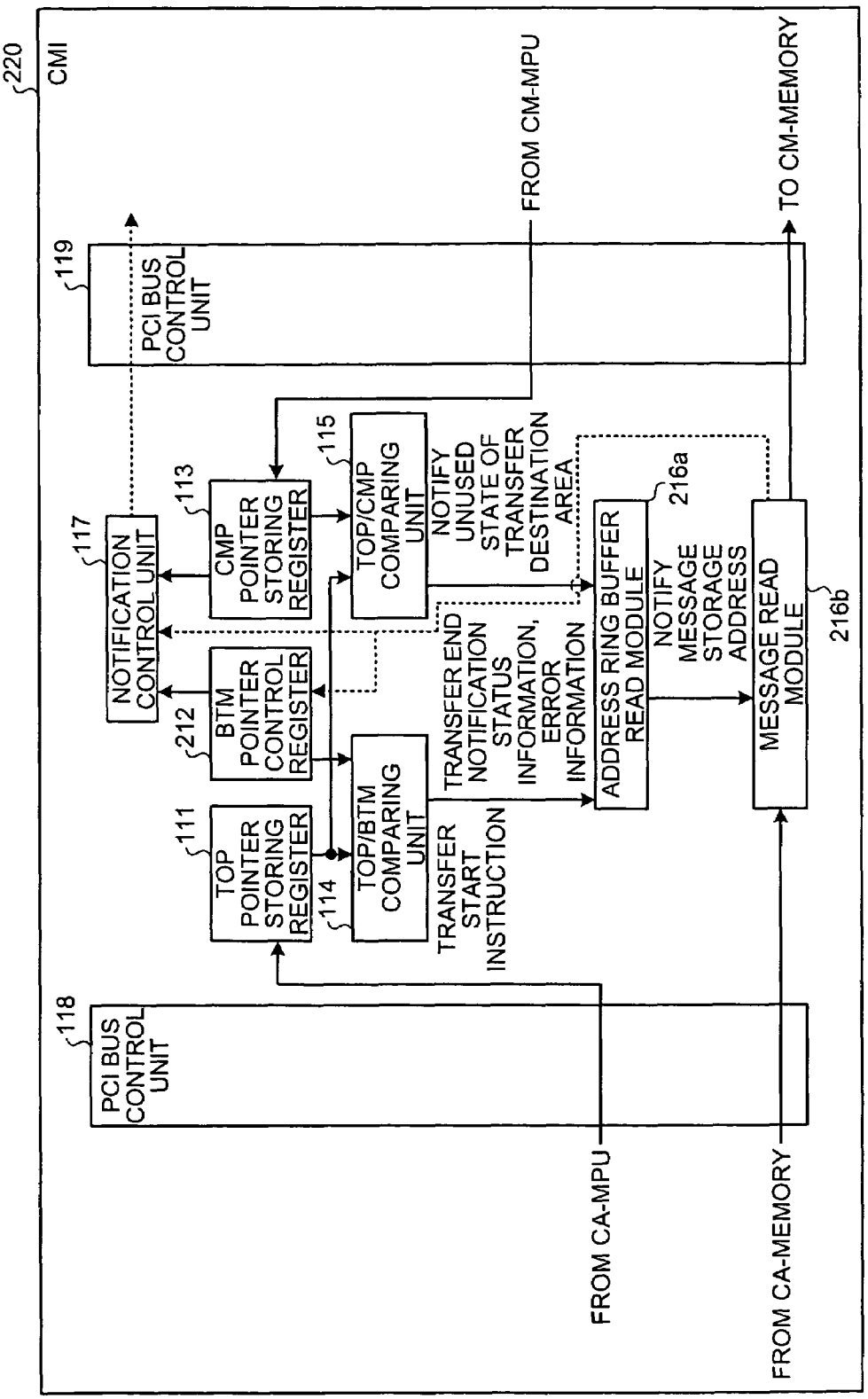
FIG. 12 is a block diagram of the CMI.

FIG. 12 is a block diagram of the CMI according to the second embodiment. For convenience of explanation, functional units playing the same roles as those of the units shown in FIG. 3 are denoted by the identical reference numerals and signs. Detailed explanations of the functional units are omitted.

As shown in FIG. 12, compared with the CMI 120 shown in FIG. 3, the CMI 220 has a BTM pointer control register 212 instead of the BTM pointer control register 112, has an address ring buffer read module 216a instead of the address ring buffer read module 116a, and has a message read module 216b instead of the message read module 116b.

Figure 13:
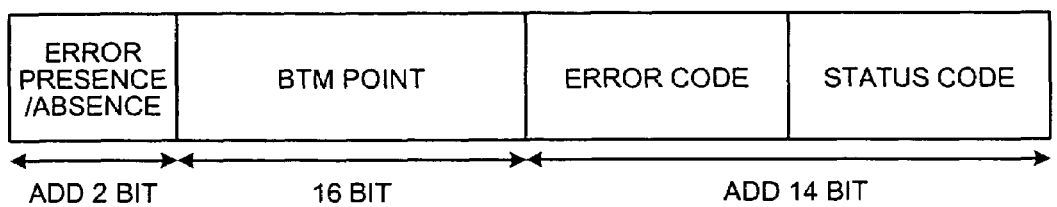
FIG. 13 is a schematic of a BTM pointer control register 212 shown in FIG. 12.

The BTM pointer control register 212 stores status information and error information in addition to a BTM pointer. FIG. 13 is a schematic of the BTM pointer control register 212. As shown in FIG. 13, the BTM pointer control register 212 includes error presence/absence indicating whether an error occurs, a BTM pointer, an error code for specifying an error, and a status code indicating a state concerning message transfer.

The address ring buffer read module 216a reads out a message storage address from a transmission ring buffer and passes the message storage address to the message read module 216b. When a parity error or a bus error occurs while the message storage address is read out, the address ring buffer read module 216a sets the error presence/absence of the BTM pointer control register 212 to the error presence and sets a code corresponding to the error in the error code and the status code.

The message read module 216b reads out a message from the CA-memory 12 and writes the message in a corresponding position of a reception ring buffer of the CM-memory 22. When a parity error, a bus error, inconsistency of transfer length, reception ring buffer full, or the like occurs while the message is received from the CA-memory 12 and written in the reception ring buffer, the message read module 216b sets the error presence/absence of the BTM pointer control register 212 to the error presence and sets a code corresponding to the error in the error code and the status code.

When the message is written in the reception ring buffer, the message read module 216b updates the BTM pointer, the error presence/absence, the error code, and the status code in the CM-memory 22 and notifies the BTM pointer control register 212 and the notification control unit 117 of transfer end.

In this way, the error presence/absence, the error code, and the status code are provided in the BTM pointer control register 212. When an error occurs during message transfer, the address ring buffer read module 216a or the message read module 216b writes information corresponding to the error in the BTM pointer control register 212. The message read module 216b updates the BTM pointer in the CM-memory 22 and additional information added to the BTM pointer. Consequently, the CM 20 can easily check whether the message transfer is normally performed.

Figure 14:
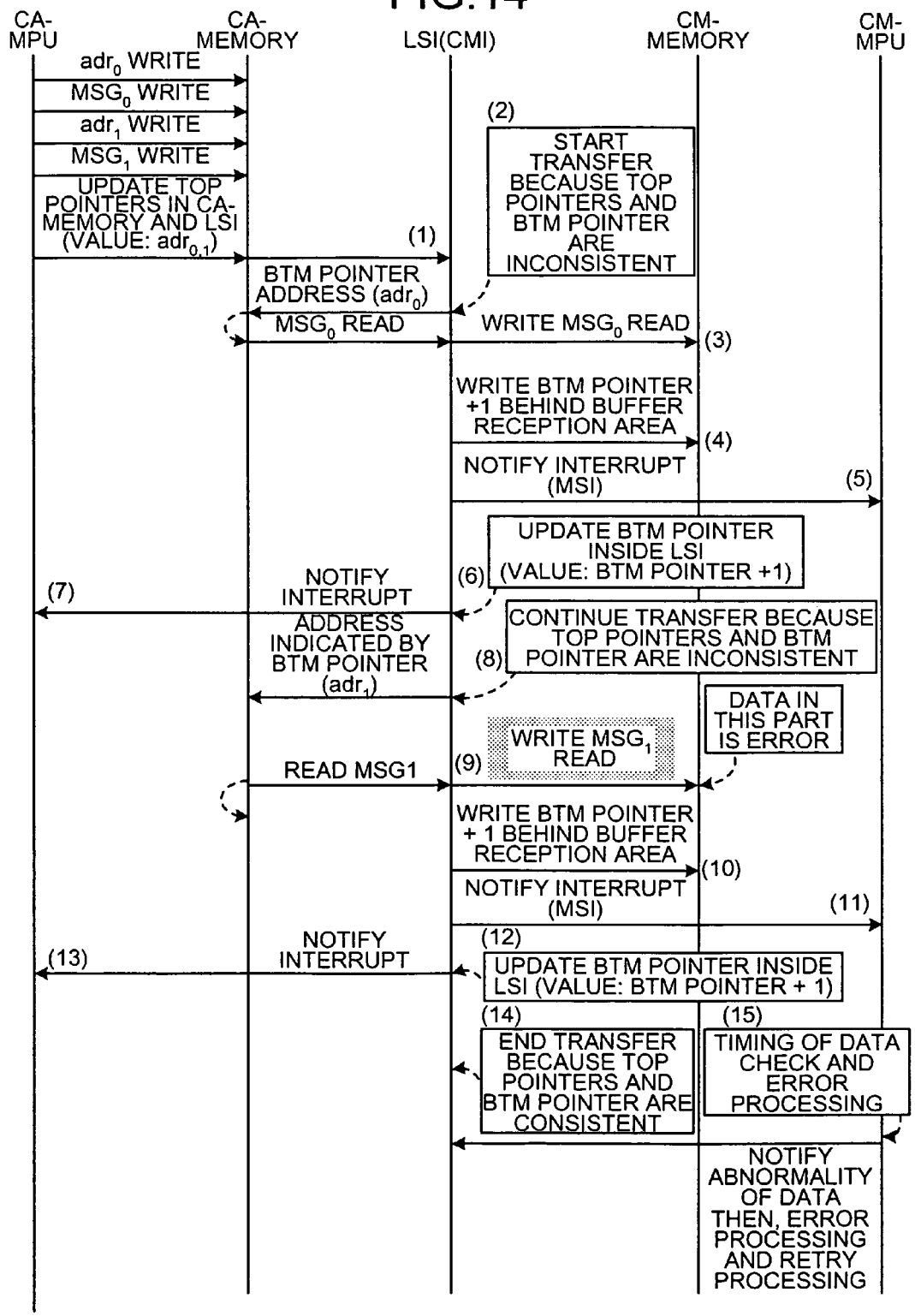
FIG. 14 is a schematic for explaining an operation sequence of message transfer from the CA to the CM by a disk array apparatus according to the second embodiment.

FIG. 14 is a schematic for explaining an operation sequence of message transfer from the CA 30 to the CM 20 by a disk array apparatus according to the second embodiment. As shown in FIG. 14, in the message transfer, the CA-MPU 11 writes messages ($MSG_0$ and $MSG_1$) to be transferred in the CA-memory 12 and writes addresses ($adr_0$ and $adr_1$) indicating storing destinations of the messages in the transmission ring buffer and updates TOP pointers in the CA-memory 12 and the LSI 200 (1).

When the TOP pointers are updated, the LSI 200 (the CMI 220) compares the TOP pointer and the BTM pointer. Since the TOP pointers and the BTM pointer are inconsistent, the LSI 200 starts message transfer (2). The LSI 200 reads out the address ($adr_0$) from a position designated by the BTM pointer of the transmission ring buffer, reads out the message ($MEG_0$) using the address readout, and writes the message in the reception ring buffer of the CM-memory 22 (3).

The LSI 200 reads out the BTM pointer control register 212, adds "1" to a value of the BTM pointer, and writes the BTM pointer in the CM-memory 22 together with status information and error information (4). The LSI 200 notifies the CM-MPU 21 of completion of transfer of one message (5).

The LSI 200 updates the BTM pointer inside the LSI 200 (6) and notifies the CA-MPU 11 of completion of transfer of one message (7). The LSI 200 compares the TOP pointers and the BTM pointer. Since the TOP pointers and the BTM pointer are inconsistent, the LSI 200 continues the message transfer (8). The LSI 200 reads out the address ($adr_1$) from a position designated by the BTM pointer of the transmission ring buffer, reads out the message ($MSG_1$) using the address read out, and writes the message in the reception ring buffer of the CM-memory 22 (9). In this case, if an error occurs, the LSI 200 writes information corresponding to the error in the BTM pointer control register 212.

The LSI 200 reads out the BTM pointer control register 212, adds "1" to a value of the BTM pointer, and writes the BTM pointer in the CM-memory 22 together with status information and error information (10). The LSI 200 notifies the CM-MPU 21 of completion of transfer of one message (11).

The LSI 200 updates the BTM pointer inside the LSI 200 (12) and notifies the CA-MPU 11 of completion of transfer of one message (13). The LSI 200 compares the TOP pointers and the BTM pointer. Since the TOP pointers and the BTM pointer are consistent, the LSI 200 ends the message transfer (14).

The CM-MPU 21 checks the status information and the error information in the CM-memory 22, confirms that an error occurs, and performs necessary error processing (15). For example, the CM-MPU 21 notifies the LSI 200 of abnormality of data and requests the LSI 200 to retry message transfer.

In this way, when an error occurs, the LSI 200 (the CMI 200) writes status information and error information corresponding to the error in the BTM pointer control register 212 and writes status information and error information of the BTM pointer control register 212 in the CM-memory 22 when the BTM pointer of the CM-memory 22 is updated. Consequently, the CM-MPU 21 can judge whether message transfer is normally performed and perform error processing in a short time.

Conventionally, when the CA-memory 12 fails and a message is not correctly transferred, it is necessary to perform processing described below.

(1) The CM-MPU 21 detects abnormality and requests the CA-MPU 11 to resent the message.
(2) The CA-MPU 11 checks states of the LSI 200 and the CA-memory 12 in the CA 30.
(3) The CA-MPU 11 investigates a suspicious portion and sends information to the CM-MPU 21.
(4) The CM-MPU 21 judges, based on the information transmitted from the CA-MPU 11, whether the CA 30 can normally transfer data and judges whether the message should be resent or the apparatus should be stopped.

On the other hand, in the disk array apparatus according to the second embodiment, the CMI 220 writes status information and error information in the CM-memory 22 together with the BTM pointer. Thus, it is possible to omit the processing of (1) to (3).

In particular, when the CM communicates with plural CDAs, if an error occurs, it is necessary to acquire information from the CAs and judge whether it is possible to normally transfer data. Thus, as in the second embodiment, each CMI writes status information and error information in the CM-memory 22 together with the BTM pointer. This makes it possible to increase speed of error processing.

Figure 15:
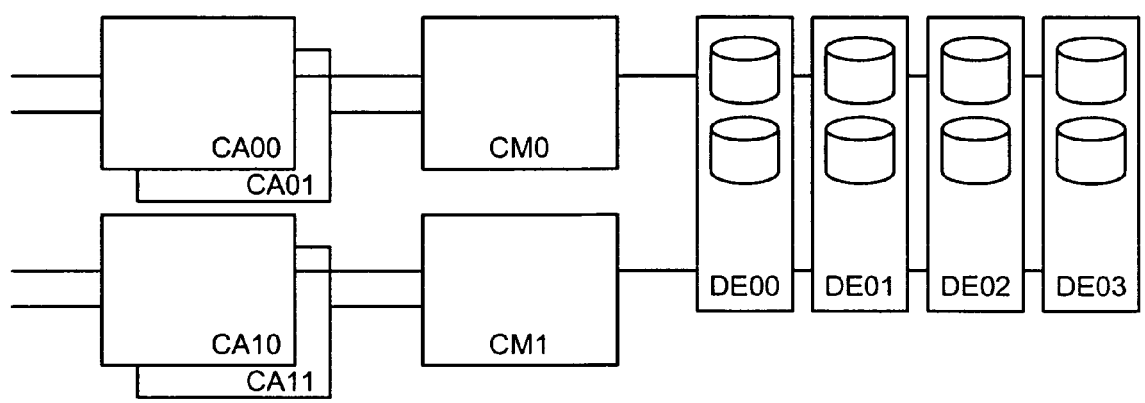
FIG. 15 is a schematic of a disk array apparatus including doubled CAs.

For example, as shown in FIG. 15, in a disk array apparatus including doubled CAs, as in the second embodiment, each CMI writes status information and error information in the CM-memory together with the BTM pointer. This makes it possible to reduce time in which transfer is not processed due to stop of the CA on one side.

As described above, in the second embodiment, the area for storing status information and error information in addition to the BTM pointer is provided in the BTM pointer control register 212. When the BTM pointer of the CM-memory 22 is updated, the BTM pointer is updated together with the status information and the error information. Thus, the CM-MPU 21 can judge whether message transfer is normally performed and perform abnormality processing at high speed.

In the explanation in the second embodiment, an address of a message is stored in the transmission ring buffer. However, the present invention is not thus limited, and can be applied in a similar manner when a message is stored in the transmission ring buffer.

In the explanation in the second embodiment, a message is transferred from the CA to the CM. However, the present invention is not thus limited, and can be applied in the same manner when a message is transferred from the CM to the CA or when data is transferred using a ring buffer between two MPUs.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A data transfer apparatus that transfers data from a transmission memory on a data transmission unit to a reception memory on a data reception unit, comprising:
    a first pointer storing unit that stores a first pointer that designates a writing location of a transmission ring buffer in the transmission memory;
    a second pointer storing unit that stores a second pointer that designates both a reading location of the transmission ring buffer and a writing location of a reception ring buffer in the reception memory;
    a determining unit that determines whether the first pointer is identical to the second pointer;
    a transfer unit that, when the first pointer is not identical to the second pointer, transfers data corresponding to the reading location of the transmission ring buffer designated by the second pointer to the writing location of the reception ring buffer designated by the second pointer; and
    an updating unit that updates the second pointer according to the data transferred by the transfer unit.

2. The data transfer apparatus according to claim 1, further comprising:
    a third pointer storing unit that stores a third pointer that designates a location of data next to data for which a reception processing is completed in the reception ring buffer; and
    an empty-state determining unit that determines whether there is a free space in the reception ring buffer based on the third pointer and any one of the first pointer and the second pointer.

3. The data transfer apparatus according to claim 2, further comprising a interrupt reissuing unit that, when the third pointer is updated, compares the third pointer with the second pointer, when the third pointer is different from the second pointer, determines that the reception processing for a plurality of data is completed in the reception ring buffer, and makes the data reception unit update the third pointer.

4. The data transfer apparatus according to claim 1, further comprising:
a measuring unit that starts measuring time when the transfer unit completes transferring the data;
a monitoring unit that monitors the time measured by the measuring unit to determine whether a predetermined time has elapsed; and
a notifying unit that notifies the data transmission unit of an abnormality when the monitoring unit determines that the predetermined time has elapsed.

5. The data transfer apparatus according to claim 1, wherein the determining unit determines a state of the data reception unit, and when the data reception unit is in a state in which data can be received, determines whether the first pointer is identical to the second pointer.

6. The data transfer apparatus according to claim 1, wherein the data transfer apparatus is connected to the data transmission unit and the data reception unit via a peripheral component interconnect bus.

7. The data transfer apparatus according to claim 1, wherein the second pointer storing unit stores the second pointer that designates data stored in the reading location of the transmission ring buffer by using a relative value that indicates a location in the transmission ring buffer.

8. The data transfer apparatus according to claim 1, wherein the second pointer storing unit stores the second pointer that designates an address stored in the reading location of the transmission ring buffer by using a relative value that indicates a location in the transmission ring buffer, the address indicating a storing location of data.

9. The data transfer apparatus according to claim 1, wherein
the second pointer storing unit stores an additional information indicating an error occurrence in the data transferring, and
the updating unit writes the additional information in the reception memory, when the second pointer is updated.

10. A data transfer method that transfers data from a transmission memory on a data transmission unit to a reception memory on a data reception unit, comprising:
writing data in a transmission ring buffer in the transmission memory;
updating a first pointer designating a writing location of the transmission ring buffer according to the data written;
determining whether the first pointer is identical to a second pointer designating both a reading location of the transmission ring buffer and a writing location of a reception ring buffer in the reception memory;
transferring, when the first pointer is not identical to the second pointer, data corresponding to the reading location of the transmission ring buffer designated by the second pointer to the writing location of the reception ring buffer designated by the second pointer; and
updating the second pointer according to the data transferred.

11. The data transfer method according to claim 10, further comprising determining whether there is a free space in the reception ring buffer based on a third pointer that designates a location of data next to data for which a reception processing is completed in the reception ring buffer and any one of the first pointer and the second pointer.

12. The data transfer method according to claim 11, further comprising an interrupt reissuing including
comparing, when the third pointer is updated, the third pointer with the second pointer;
determining, when the third pointer is different from the second pointer, that the reception processing for a plurality of data is completed in the reception ring buffer; and
making the data reception unit update the third pointer.

13. The data transfer method according to claim 10, further comprising:
starting measuring time when the data transferring is completed at the transferring;
monitoring the time measured to determine whether a predetermined time has elapsed; and
notifying the data transmission unit of an abnormality when it is determined that the predetermined time has elapsed at the monitoring.

14. The data transfer method according to claim 10, wherein the determining includes
determining a state of the data reception unit; and
determining, when the data reception unit is in a state in which data can be received, whether the first pointer is identical to the second pointer.

15. The data transfer method according to claim 10, wherein the data transfer apparatus is connected to the data transmission unit and the data reception unit via a peripheral component interconnect bus.

16. The data transfer method according to claim 10, wherein the second pointer designates data stored in the reading location of the transmission ring buffer by using a relative value that indicates a location in the transmission ring buffer.

17. The data transfer method according to claim 10, wherein the second pointer designates an address stored in the reading location of the transmission ring buffer by using a relative value that indicates a location in the transmission ring buffer, the address indicating a storing location of data.

18. The data transfer method according to claim 10, further comprising:
retaining an additional information indicating an error occurrence in the data transferring and
writing the additional information in the reception memory, when the second pointer is updated.

19. A data transfer apparatus transferring data from a transmission memory on a data transmitter to a reception memory on a data receiver, comprising:
a controller
storing a first pointer designating a writing location of a transmission ring buffer in the transmission memory;
storing a second pointer designating both a reading location of the transmission ring buffer and a writing location of a reception ring buffer in the reception memory;
determining whether the first pointer is identical to the second pointer;
transferring, when the first pointer is not identical to the second pointer, transfers data corresponding to the reading location of the transmission ring buffer designated by the second pointer to the writing location of the reception ring buffer designated by the second pointer; and
updating the second pointer according to the data transferring.

20. The apparatus according to claim 19, wherein the updating further comprises writing transfer information related to the data transferring in the reception memory.

21. The apparatus according to claim 20, wherein the transfer information comprises error information.

* * * * *